(12) United States Patent
Kodama et al.

(10) Patent No.: US 6,390,215 B1
(45) Date of Patent: May 21, 2002

(54) ELECTRIC VEHICLE

(75) Inventors: Hiroki Kodama; Ryoji Ei; Yukihisa Ishii, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/322,898

(22) Filed: May 29, 1999

(30) Foreign Application Priority Data

May 29, 1998 (JP) ............................. 10-149957

(51) Int. Cl.[7] ............................. B60L 9/08; B60K 6/10
(52) U.S. Cl. ......................... 180/65.3; 180/2.1
(58) Field of Search ............................ 180/2.1, 65.3, 180/68.5, 2.2; 320/104

(56) References Cited

U.S. PATENT DOCUMENTS

| | | | | |
|---|---|---|---|---|
| 3,090,871 A | * | 5/1963 | Gorman ...................... 320/105 |
| 4,199,037 A | * | 4/1980 | White ......................... 180/65.3 |
| 4,261,329 A | * | 4/1981 | Walsh et al. ................. 180/65.3 |
| 5,178,403 A | * | 1/1993 | Kemner et al. .............. 180/65.3 |
| 5,283,513 A | * | 2/1994 | Fujita et al. ................... 320/56 |
| 5,448,152 A | * | 9/1995 | Albright ........................ 320/15 |
| 5,767,663 A | * | 6/1998 | Lu ................................. 180/24 |
| 5,921,334 A | * | 7/1999 | Al-Dokhi .................... 180/65.3 |
| 5,941,328 A | * | 8/1999 | Lyons et al. ................ 180/65.1 |
| 5,963,013 A | * | 10/1999 | Watson et al. .............. 320/107 |
| 5,969,501 A | * | 10/1999 | Glidden et al. ............. 320/101 |

* cited by examiner

Primary Examiner—Lanna Mai
Assistant Examiner—Jeffrey Restifo
(74) Attorney, Agent, or Firm—Carrier, Blackman & Associatres, P.C.; Joseph P. Carrier; William D. Blackman

(57) ABSTRACT

An electric vehicle includes a main battery mounted on a vehicle body and a sub-battery detachably connected to the vehicle body. The electric vehicle travels with the electric power of the main battery in the case where the traveling distance is not long. In the case where the traveling distance is long, a trailer with the sub-battery is coupled to the rear of the electric vehicle, so that both the electric powers of the two batteries are used to drive an electric motor to allow the electric vehicle to travel. At the time of driving of the motor, the electric power of the sub-battery is preferentially used. When the sub-battery becomes completely discharged, the trailer is disconnected from the electric vehicle. In this case, with the vehicle body weight reduced, the traveling of the electric vehicle with the electric power of the main battery can be continued, and therefore the total traveling distance is further increased. At the time of regeneration of electrical energy by the motor during braking operations, the main battery is preferentially charged with the regenerative power, so that the electric power of the main battery is maintained as long as possible.

7 Claims, 7 Drawing Sheets

ELECTRIC VEHICLE

BACKGROUND OF THE INVENTION

1. Field of the Invention

This invention relates to an electric vehicle which travels with an electric motor driven by a chargeable battery mounted on a vehicle body.

The present application is based on Japanese Patent Application No. Hei. 10-149957, which is incorporated herein by reference.

2. Description of the Related Art

An electric vehicle which travels with a battery produces no exhaust gas, and is silent, thus being suitable for the traveling of a vehicle in an area which should be free from noise or in an environment protection area. In addition, a traveling distance per one battery charging is not affected by traffic congestion, and therefore the electric vehicle is suitable as a short-distance commuting vehicle (so-called "a city commuter").

One of the problems accompanying the electric vehicle is that a traveling distance per one battery charging is short. If no infrastructure for charging batteries is provided, it is difficult for the electric vehicle to achieve long-distance traveling using high-speed roads.

Hence, research effort for development of high-performance batteries which are light in weight and high in charging capacity, development of high-performance motors which are small in power consumption and high in output power, and a recovery brake technique to achieve energy regeneration efficiently, have been conducted and still being proceeded.

However, in spite of the above-described efforts, it is difficult to greatly increase the traveling distance of an electric vehicle, and therefore still there has been a strong demand for an increase in the traveling distance of an electric vehicle.

SUMMARY OF THE INVENTION

In view of the foregoing, an object of the invention is to provide an electric vehicle which has a great convenience for short-distance traveling, and is sufficiently useful for long-distance traveling, too.

In order to achieve the foregoing object of the invention, there is provided an electric vehicle having a main battery mounted on a vehicle body; a sub-battery detachably connected to the vehicle body; an electric motor being driven by the main battery and the sub-battery, thereby to generate a traveling drive force and which generates a regenerative brake force at deceleration of the vehicle body; and control means for controlling drive and generation operations of the motor. When the sub-battery is connected to the vehicle body, the control means controls the motor so that (i) the motor preferentially uses an electric power of the sub-battery for driving the motor and (ii) the motor preferentially charges the main battery by a regenerative power generated by the motor.

The electric vehicle is designed as described above. Therefore, with the sub-battery coupled to the vehicle body, the electric powers of the main battery and of the sub-battery can be used to increase the traveling distance of the electric vehicle. In the case where it is not necessary for the electric vehicle to travel a long distance, the sub-battery may be disconnected from the vehicle body; in this case, the electric vehicle is reduced in weight as much, and is improved in mobility, and the energy usage otherwise required for carrying the sub-battery is eliminated. When driving the motor, the electric power of the sub-battery is preferentially used. Therefore, if the sub-battery which is emptied of its change earlier is removed, then under the condition that the vehicle weight is reduced, the traveling can be continued with the electric power of the main battery, so that the total traveling distance is further increased. In addition, when of the motor, regenerates electrical energy during braking. The main battery is preferentially charged by the regenerative power. Therefore, with the electric power of the main battery maintained unchanged, the traveling distance is maximumly increased after the sub-battery is removed. Furthermore, when the main battery is emptied, before the completion of the charging of the main battery the traveling can be started with the sub-battery coupled to the vehicle body.

Preferably, in the electric vehicle, the driving of the motor by the main battery is started after the sub-battery has been completely discharged.

In the electric vehicle thus designed, after the sub-battery has been completely discharged, the driving of the motor with the main battery is permitted. Therefore, while the power of the main battery is being maintained unchanged, the power of the sub-battery is effectively used to the last. Thus, the traveling distance of the electric vehicle is increased as much.

The state that the sub-battery has been completely discharged is not limited to the state that the left-quantity of the sub-battery has become 0%; that is, it may be the state that the sub-battery has a predetermined left-quantity with which the damage of the sub-battery by over-discharge is avoided.

Preferably, in the electric vehicle, the charging of the sub-battery by the regenerative power is started after the main battery has been completely charged.

In the electric vehicle thus designed, the charging of the sub-battery by the regenerative power is permitted after the main battery has been completely charged. Hence, the traveling distance is increased with the main battery maintained completely charged.

The state that the main battery has been completely charged is not limited to the state that the left-quantity of the main battery has become 100%; that is, it may be the state that the main battery has a predetermined left-quantity with which the damage of the main battery by over-charge is avoided.

Preferably, in the electric vehicle, the sub-battery is mounted on a trailer which is detachably coupled to the vehicle body.

Hence, in the electric vehicle thus designed, it is unnecessary to provide a space for setting the sub-battery. Hence, the degree of freedom in the design of a vehicle body is improved as much, and without great modification the existing electric vehicle can be used as it is. Furthermore, since the sub-battery is mounted on the trailer, a battery of large capacity can be used with no trouble, and merely by connecting the trailer to the vehicle body, the connection of the sub-battery can be readily achieved.

Features and advantages of the invention will be evident from the following detailed description of the preferred embodiments described in conjunction with attached drawings.

DETAILED DESCRIPTION OF THE PREFERRED EMBODIMENTS

The invention will be described with reference to its presently preferred embodiments shown in the accompanying drawings.

Figure 1:
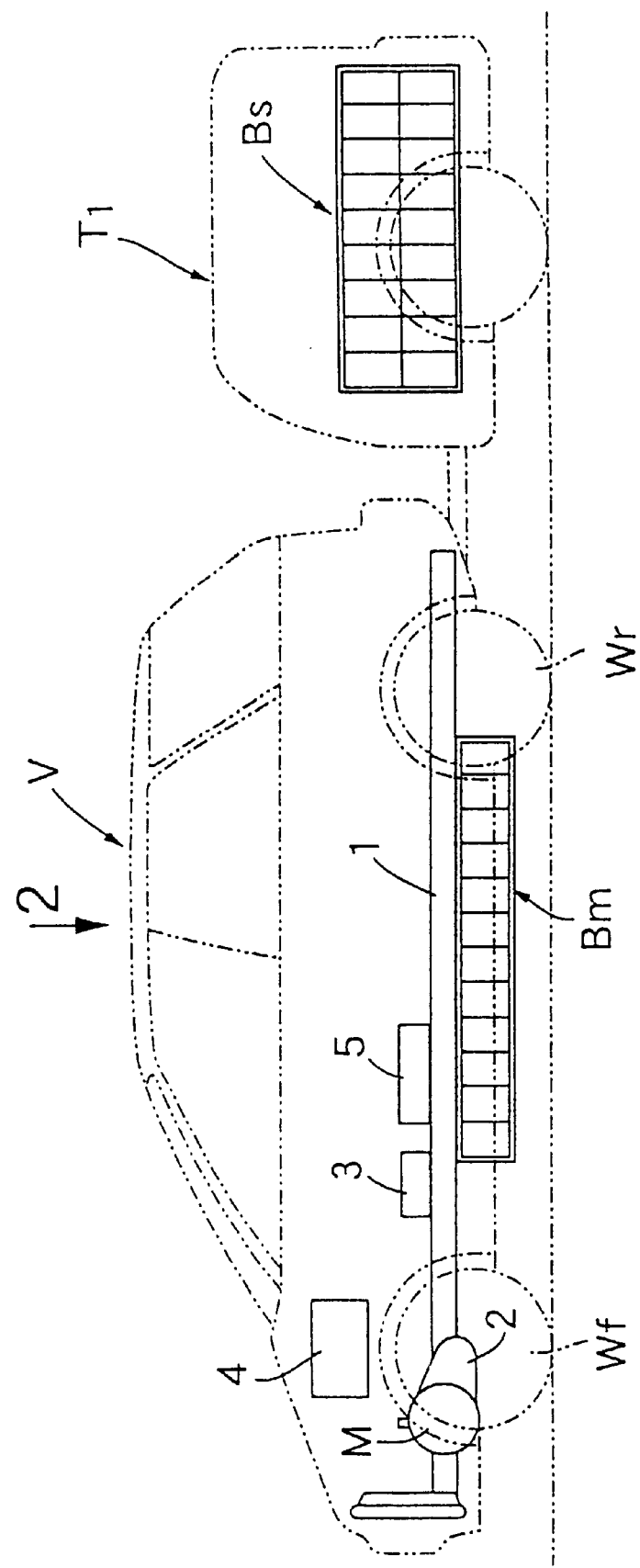
FIG. 1 is a side view showing an electric vehicle to which a first trailer is coupled.
Figure 2:
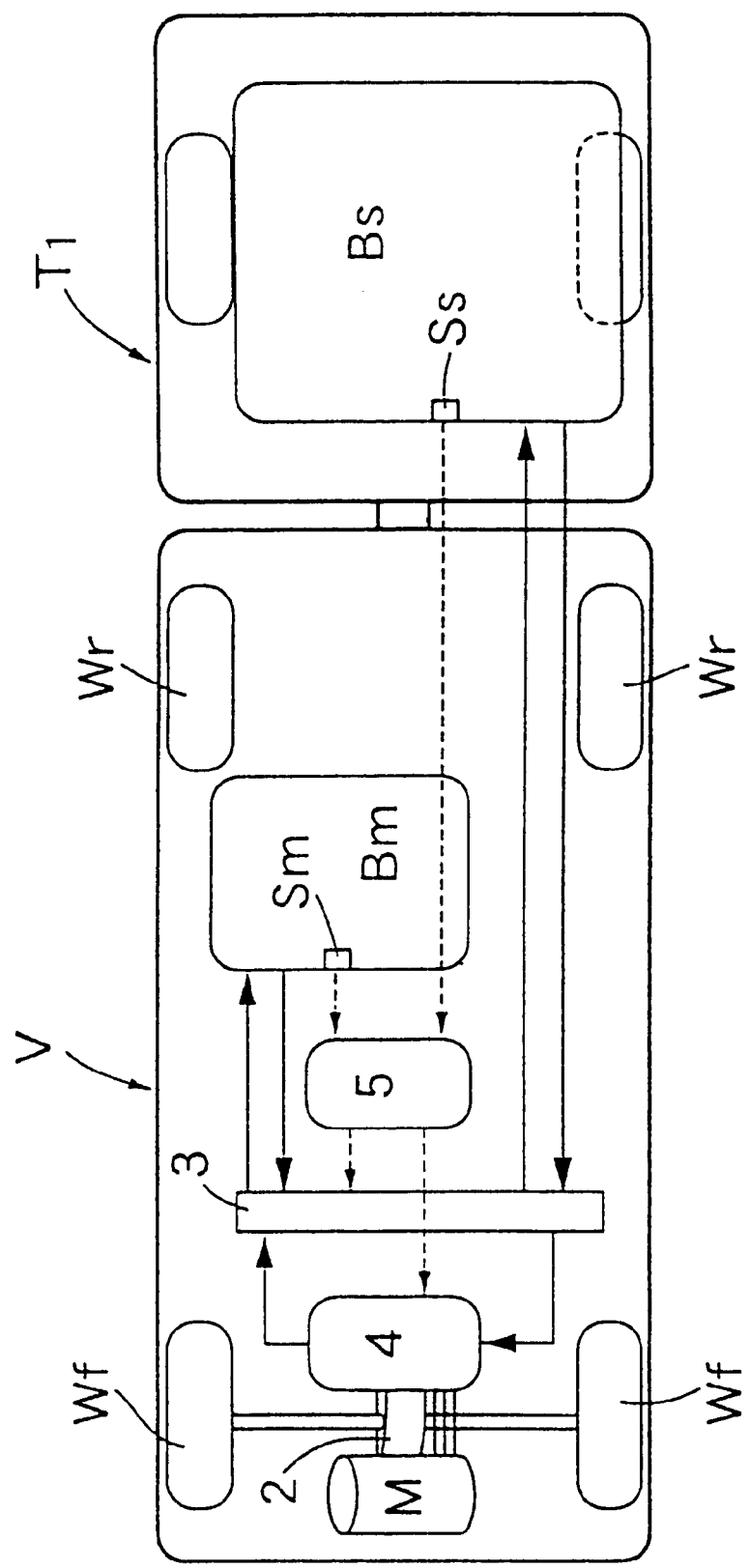
FIG. 2 is a schematic diagram showing the electric vehicle and the first trailer as viewed in the direction of the arrow 2 in FIG. 1.
Figure 3:
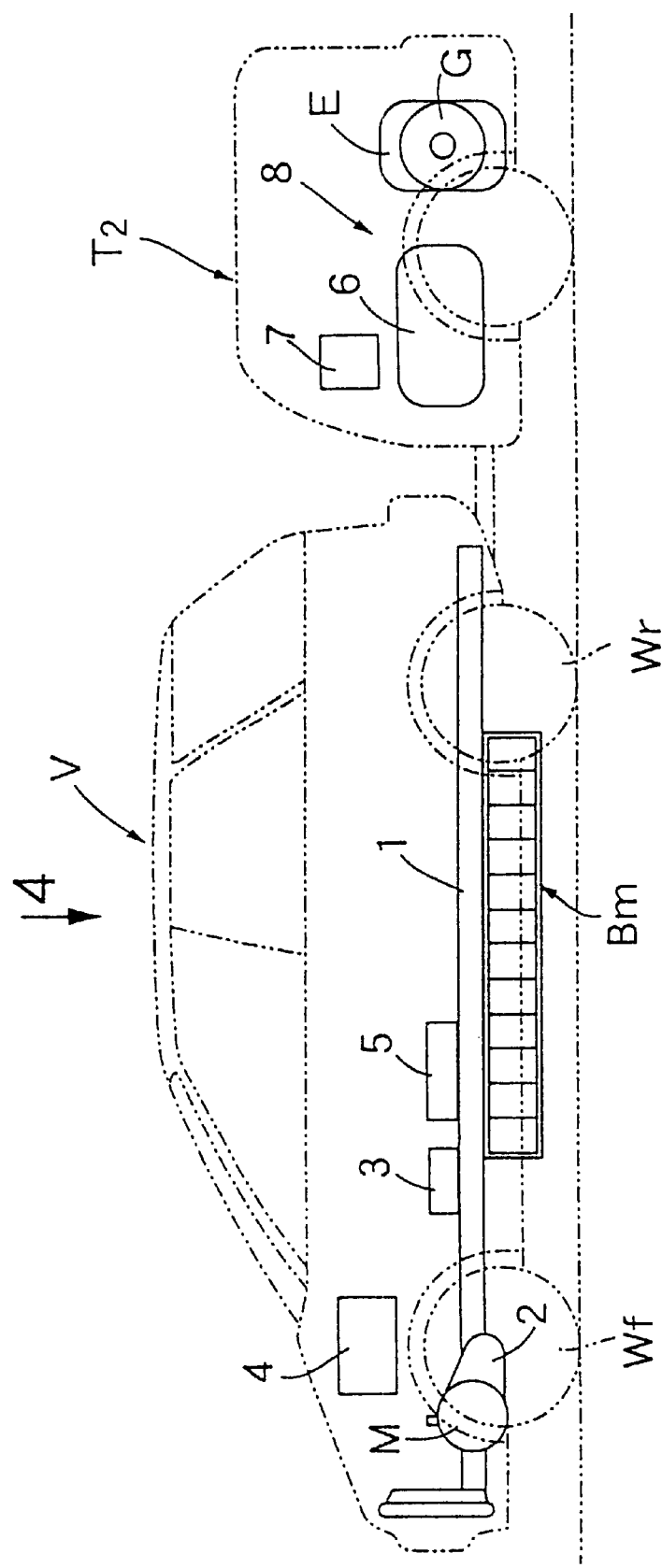
FIG. 3 is a side view of the electric vehicle to which a second trailer is coupled.
Figure 4:
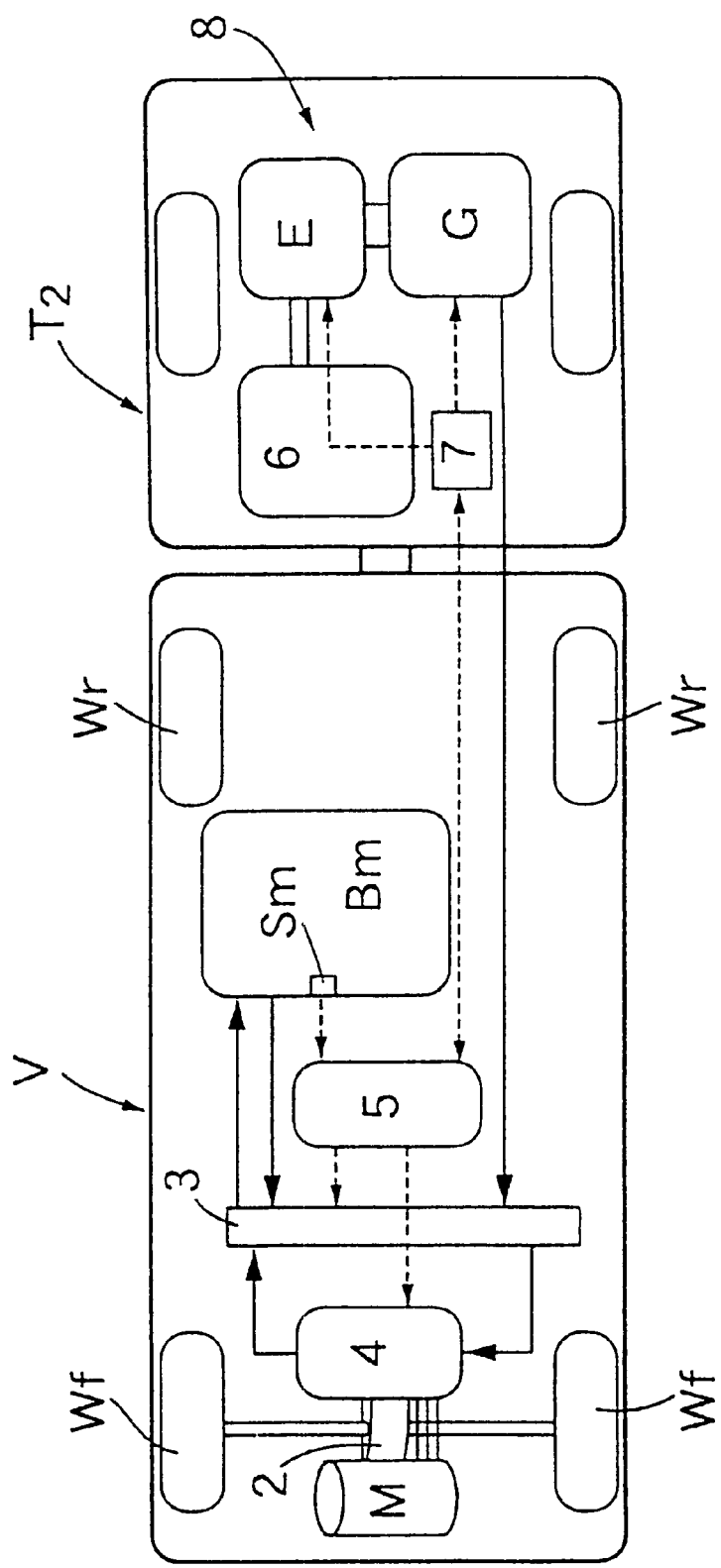
FIG. 4 is a schematic diagram showing the electric vehicle and the second trailer as viewed in the direction of the arrow 4 in FIG. 3.
Figure 5:
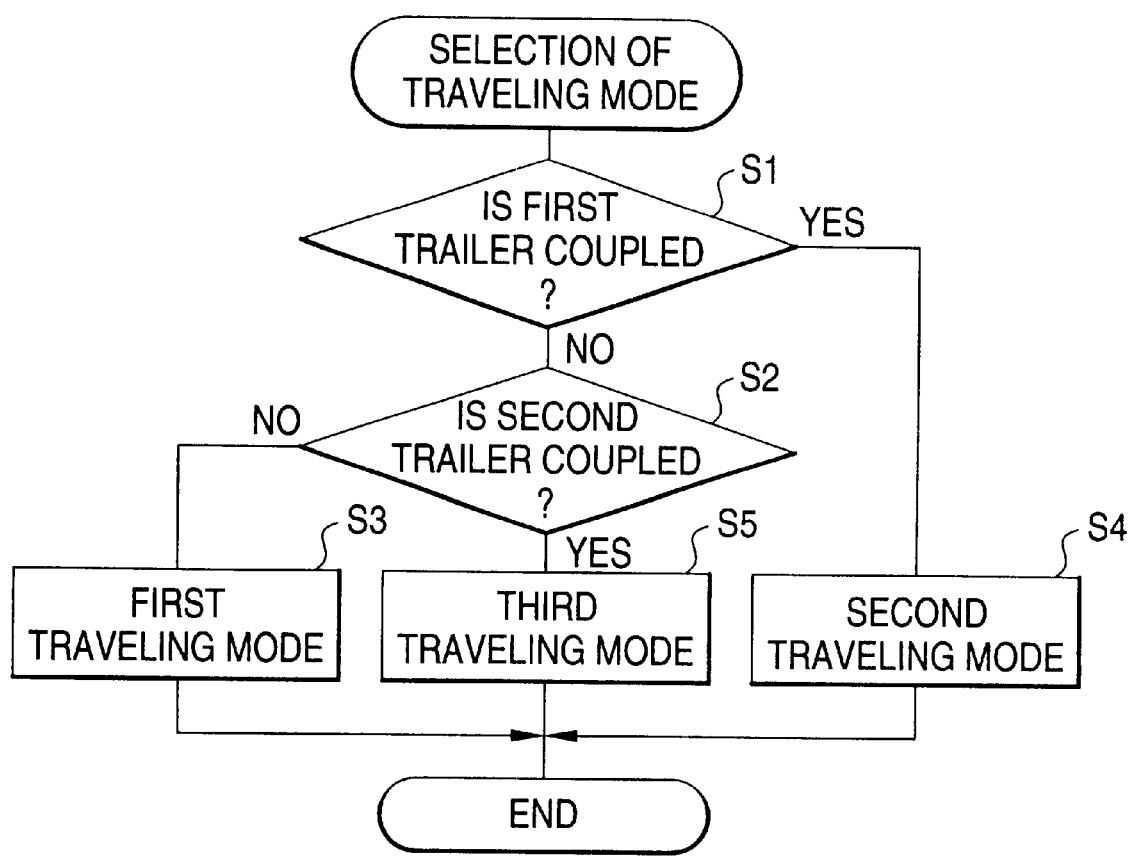
FIG. 5 is a flow chart of a traveling mode selection routine.
Figure 6:
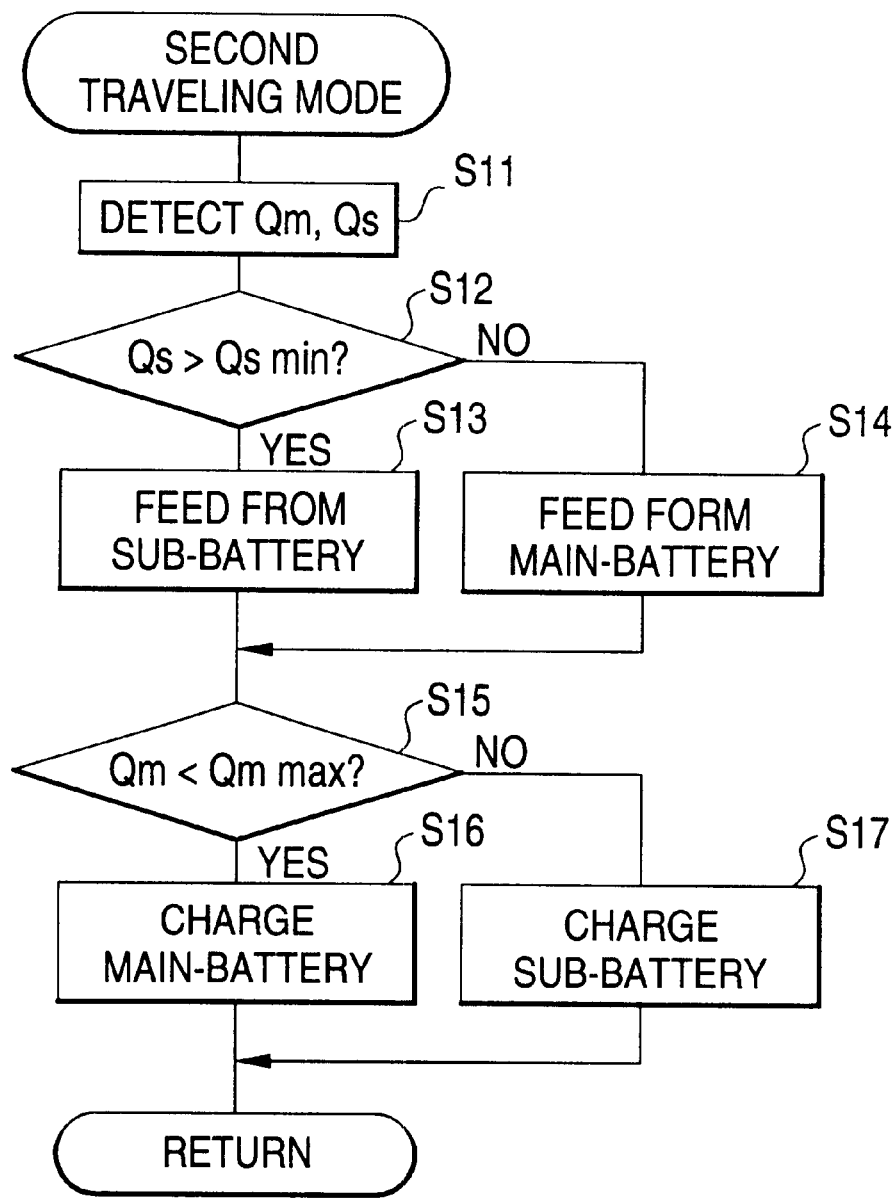
FIG. 6 is a flow chart of a second traveling mode selection roution.
Figure 7:
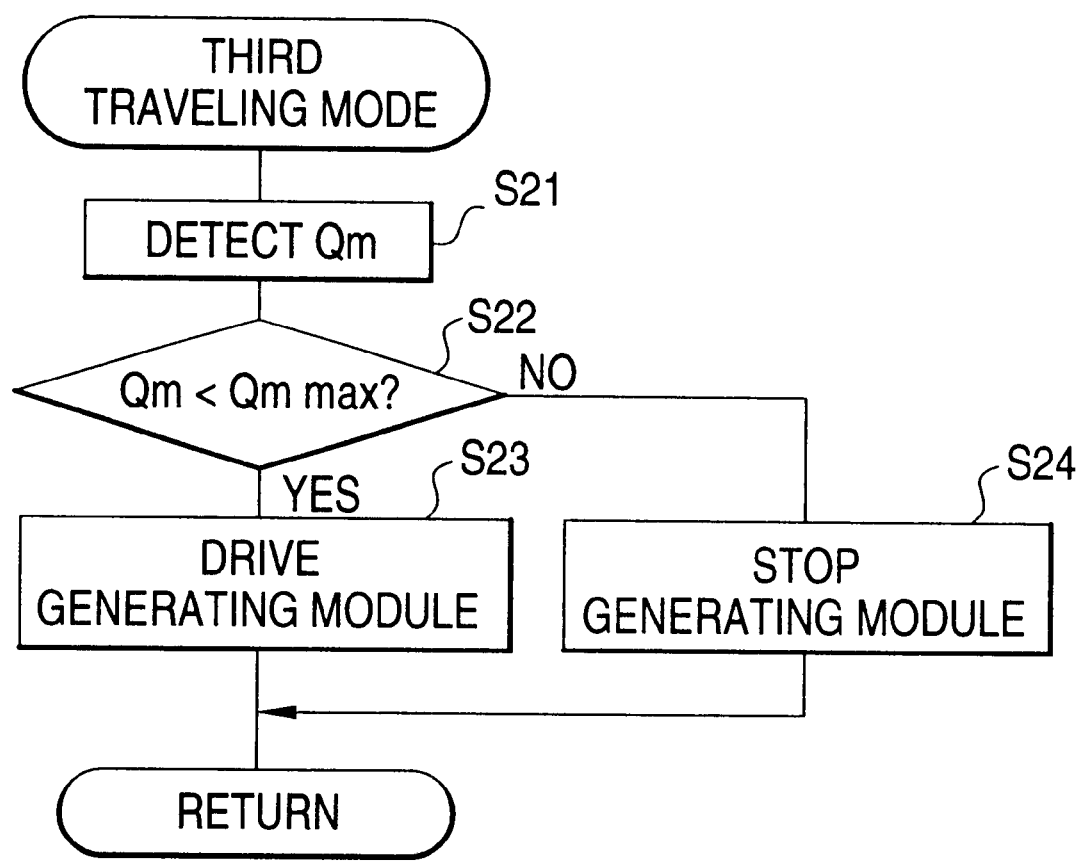
FIG. 7 is a flow chart of a third traveling mode selection roution.

FIGS. 1 through 7 shows the embodiment of the invention. FIG. 1 is a side view of an electric vehicle to which a first trailer is coupled. FIG. 2 is a schematic diagram showing the electric vehicle and the first trailer as viewed in the direction of the arrow 2 in FIG. 1. FIG. 3 is a side view of the electric vehicle to which a second trailer is coupled. FIG. 4 is a schematic diagram showing the electric vehicle and the second trailer as viewed in the direction of the arrow 4 in FIG. 3. FIG. 5 is a flow chart of a traveling mode selection routine. FIG. 6 is a flow chart of a second traveling mode. FIG. 7 is a flow chart of a third traveling mode.

As shown in FIGS. 1 and 2, an electric vehicle V has right and left front wheels wf and Wf, and right and left rear wheels Wr and Wr, and a traveling motor M mounted on the front parts of a pair of side frames 1, 1 which are extended in the front-to-rear direction of the vehicle body. The motor M is connected through a transmission 2 to driving wheels, namely, the front wheels Wf and Wf. A main battery Bm is mounted on the central region of the side frames 1 and 1, and is connected through a junction board 3 and a PDU (power drive unit) 4 to the motor M. A first trailer $T_1$ is detachably coupled to the rear of the electric vehicle V. On the first trailer $T_1$, a sub-battery Bs larger in capacity than the main battery Bm is mounted. The sub-battery Bs is connected through the junction board 3 and the PDU 4 to the motor M. The motor M also functions as a generator during regenerative braking of the vehicle, helping to selectively re-charge the batteries Bm, Bs. Accordingly, the motor M may also be referred to as a motor-generator.

Furthermore, the electric vehicle V has a control unit 5. The control unit 5 receives signals from a main battery left-quantity sensor Sm and from a sub-battery left-quantity sensor Ss. The main battery left-quantity sensor Sm detects vehicle operating conditions such as the number of revolutions per minutes (speed) of the motor (hereinafter referred to as "a motor speed", when applicable), an accelerator opening degree, a shift position, and a brake operation, and the left quantity of the main battery Bm. The sub-battery left-quantity sensor Ss detects the left quantity of the sub-battery Bs.

The PDU 4 is to control the drive and regeneration of the motor M in response to instructions from the control unit 5 which are based on vehicle operating conditions. More specifically, the PDU 4 converts the DC current of the main battery Bm or sub-battery Bs into 3-phase AC currents. Furthermore, during the regeneration of the motor M, it converts the 3-phase AC currents generated by the motor M into DC current to charge the main battery Bm or sub-battery Bs. The control unit 5 is connected to the junction board 3, and, according to the left-capacities of the main battery Bm and the sub-battery Bs, connects selectively one of those batteries Bm and Bs to the PDU 4 and the motor M.

As shown in FIGS. 3 and 4, a second trailer $T_2$ different from the first trailer $T_1$, is detachably coupled to the electric vehicle V. A generating module 8 is mounted on the second trailer. The generating module 8 comprises: an engine E; a generator G driven by the engine E; a fuel tank 6 for supplying fuel to the engine E; and a controller 7 which controls the amount of electric generation of the generator G, and transmits signals to the control unit 5 (on the electric vehicle V) and receives signals from the latter 5. When the second trailer $T_2$ is coupled to the electric vehicle V, the generator G is connected through the junction board 3 to the main battery Bm of the electric vehicle V. The control unit 5 controls the PDU 4, and controls the amount of electric generation of the generator module 8 according to the left-quantity of the main battery Bm detected by the main battery sensor Sm.

Now, the function of the embodiment will be described with reference to FIGS. 5 through 7, the flow charts.

When in Step S1 in the flow chart of FIG. 5, the first trailer $T_1$ is not coupled to the electric vehicle V, and in Step S2 the second trailer $T_2$ is not coupled to the electric vehicle: that is, when the electric vehicle V travels without the first and second trailers, in Step S3 a first traveling mode is selected. When in Step S1 the first trailer $T_1$ is coupled to the electric vehicle V, in Step S4 a second traveling mode is selected. When in Step S1 the first trailer $T_1$ is not coupled to the electric vehicle V, and in Step S2 the second trailer $T_2$ is coupled thereto, in Step S5 a third traveling mode is selected.

The first traveling mode is the ordinary traveling mode of the electric vehicle V. In the mode, the vehicle travels only with the electric power of the main battery Bm charged by an external power source. That is, during acceleration, or during cruising, the motor M is driven with the electric power of the main battery Bm; and during deceleration the motor M is subjected to regenerative brake, so that the main battery Bm is charged with the electric power thus regenerated; that is, the kinetic energy of the vehicle body is recovered as electrical energy to increase the traveling distance. This first traveling mode is suitable for the case where the electric vehicle travels a short distance. In the first traveling mode, the energy source of the electric vehicle V is only the main battery Bm, and therefore the traveling distance is short. However, the electric vehicle V can move around more freely with the first or second trailer disconnected therefrom; that is, the electric vehicle V is improved in mobility, and the maximum traveling distance is obtained with the limited capacity of the main battery Bm.

In the second traveling mode (in which the first trailer $T_1$ is connected to the electric vehicle), the electric vehicle travels with the electric power of the main battery Bm of the electric vehicle V and with the electric power of the sub-battery Bs on the first trailer $T_1$. In the second traveling mode, the traveling distance is longer than that in the above-described first traveling mode.

More specifically, in Step S11 in the flow chart of FIG. 6, the left-quantity Qm of the main battery Bm is detected with the main battery left-quantity sensor Sm, and the left-quantity Qs of the sub-battery Bs is detected with the sub-battery left-quantity sensor Ss. If, in Step S12, the left-quantity Qs of the sub-battery Bs exceeds the left-quantity $Qs_{min}$ which is obtained when the battery is completely discharged; that is, if the sub-battery Bs has the left-quantity Qs, then in Step S13 the electric vehicle travels with the motor M driven by the power of the sub-battery Bs. On the other hand, if, in Step S12, the left-quantity Qs of the sub-battery Bs is equal to or less than the aforementioned left-quantity $Qs_{min}$; that is, if the sub-battery Bs is empty, then in Step S14 the electric vehicle travels with the motor M driven by the main battery Bm.

If, in Step S15, the left-quantity Qm of the main battery Bm is less than the left-quantity $Qm_{max}$ which is obtained when the battery is completely charged; that is, if the main battery Bm can be still charged, then in Step S16 the main battery Bm is given priority in charging with the regenerative power of the motor M. On the other hand, if, in Step S15, the left-quantity Qm of the main battery Bm is more than the aforementioned left-quantity $Qm_{max}$; that is, if the main battery Bm has been completely charged, in Step S17 the sub-battery Bs is charged with the regenerative power of the motor M.

As was described above, the electric power of the sub-battery Bs is given priority in use when the motor M is used, and when the sub-battery Bs is emptied, the electric power of the main battery Bm is used. Hence, under the condition that the vehicle body is reduced in weight with the first trailer $T_1$ disconnected from the electric vehicle, the traveling of the electric vehicle with the main battery Bm is maximumly continued, and the total traveling distance of the electric vehicle v is increased. Furthermore, during the regenerative braking operation, the main battery Bm is preferentially charged with the regenerative power of the motor. Therefore, the main battery Bm is maintained completely charged, so that the electric power is kept unchanged to the end, whereby after the removal of the first trailer $T_1$ the traveling distance is further increased. Even if the main battery Bm is empty, it is unnecessary to postpone the use of the electric vehicle until the charging of the main battery Bm by the external power source is accomplished; that is, with the first trailer $T_1$ coupled to the electric vehicle V, the traveling of the latter V can be started immediately.

As was described above, the first trailer $T_1$, on which the sub-battery Bs is mounted, is coupled to the electric vehicle V. Therefore, the existing electric vehicle V is used as it is, and yet the traveling distance thereof is increased. Furthermore, the main battery Bm mounted on the electric vehicle may be one whose capacity is smallest but necessarily sufficient, which reduces the weight of the vehicle body, thus improving the movability of the latter. The sub-battery Bs is mounted on the first trailer $T_1$, as was described above. Hence, the sub-battery Bs may be large in capacity. And, merely by coupling the first trailer $T_1$ to the electric vehicle V, the connection of the sub-battery Bs can be accomplished.

In the third traveling mode, in which the second trailer $T_2$ is coupled to the electric vehicle V, the latter V travels with the electric power of the main battery Bm of the electric vehicle V and with the electric power generated by the generator G on the second trailer $T_2$. In the third traveling mode, the traveling distance is much longer than in the second traveling mode.

This will be described specifically. In Step S21 of FIG. 7, the flow chart, the left-quantity Qm of the main battery Bm is detected with the main-battery left-quantity sensor Sm. If, in Step S22, the left-quantity Qm of the main battery Bm is less than the left-quantity $Qm_{max}$ which is obtained when the main battery has been completely charged; that is, if the main battery Bm is still chargeable, then in Step S23 the generator G is driven by the engine E of the generating module 8 to generate electric power which is used for charging the main battery Bm. On the other hand, if, in Step S22, the left-quantity Qm of the main battery Bm is equal to or more than the aforementioned left-quantity $Qm_{max}$; that is, if the main battery Bm has been fully charged, then in Step S24 the operation of the generating module 8 is stopped; that is, the charging of the main battery Bm is suspended.

In the case where the second trailer $T_2$ is coupled to the electric vehicle, the left-quantity of the main battery Bm, the quantity of fuel left in the fuel tank 6, and the abnormal condition of the generating module 8 are displayed on a multi-information means on the instrument panel of the electric vehicle V.

As was described above, in the embodiment, the generating module 8 on the second trailer $T_2$ is driven to generate electric power, which charges the main battery Bm. Hence, the traveling distance corresponds to the quantity of fuel in the fuel tank 6; in other words, the electric vehicle can travel as long as fuel remains in the fuel tank. If, in the case where the electric vehicle travels a short distance, the second trailer $T_2$ is disconnected from the electric vehicle V, the latter V is movable more freely; that is, it is improved in mobility, and in addition the energy for towing the second trailer $T_2$ is saved as much. The main battery Bm may be small in capacity, and yet the traveling distance can be increased when necessary. Furthermore, since the engine E on the second trailer $T_2$ is spaced from the electric vehicle V, vibration or noise which may be given to the passenger or passengers in the electric vehicle V is decreased. Moreover, even when the main battery Bm becomes empty, the traveling can be started immediately when the second trailer $T_2$ is coupled to the electric vehicle.

In addition, whenever the left-quantity of the main battery Bm becomes less than the value which is obtained when the latter Bm has been fully charged, the generating module 8 is driven by the engine E to charge the main battery Bm; that is, the main battery Bm is kept fully charged at all times, and after the second trailer T2 is disconnected from the electric vehicle, the traveling distance is sufficiently long, maximum.

At many positions, gasoline supplying infrastructures are provided which are fully serviceable. Hence, if the second trailer $T_2$ is connected to the electric vehicle V, then the latter V is equivalent in traveling distance to a gasoline-operated vehicle. If a station for connecting the first or second trailer ($T_1$ or $T_2$) from the electric vehicle V or disconnecting it from the latter V is provided at each inter-change of a high way, and the first or second trailer is rented as a rented trailer, then more conveniently the electric vehicle V can achieve a long distance traveling using a high way.

While there have been described in connection with the preferred embodiments of the present invention, various changes and modifications may be made therein without departing from the invention.

For instance, in the above-described embodiments, the present first trailer $T_1$, on which the sub-battery Bs is mounted, is connected to or disconnected from the electric vehicle V. However, without use of the trailer, the sub-battery Bs may be mounted directly on the vehicle body providing a space therefor.

The electric vehicle according to the present invention is designed as described above. Therefore, with the sub-battery coupled to the vehicle body, both the electric powers of the main battery and of the sub-battery can be used to increase the traveling distance of the electric vehicle. In the case where it is not necessary to travel a long distance, the sub-battery may be disconnected from the vehicle body; in this case, the electric vehicle is reduced in weight as much, and is improved in mobility, and the energy for carrying the sub-battery can be eliminated. At the time of driving of the motor, the electric power of the sub-battery is preferentially used. Therefore, if the sub-battery which is emptied earlier is removed, then under the condition that the vehicle weight is reduced, the traveling can be continued with the electric power of the main battery, so that the total traveling distance is further increased. In addition, at the time of regeneration of the motor, the main battery is preferentially charged by the regenerative power. Therefore, with the electric power of the main battery maintained unchanged, the traveling distance is maximumly increased after the sub-battery is removed. Furthermore, when the main battery is emptied, before the completion of the charging of the main battery the traveling can be started with the sub-battery coupled to the vehicle body.

In the electric vehicle, after the sub-battery has been completely discharged, the driving of the motor with the main battery is permitted. Therefore, while the power of the main battery is being maintained unchanged, the power of the sub-battery is effectively used to the last. Thus, the traveling distance of the electric vehicle is increased as much.

In the electric vehicle, the charging of the sub-battery by the regenerative power is permitted after the main battery has been completely charged. Hence, the traveling distance can be increased with the main battery maintained completely charged.

In the electric vehicle thus designed, it is unnecessary to provide a space for setting the sub-battery. Hence, the degree of freedom in the design of a vehicle body is improved as much, and without great modification the existing electric vehicle can be used as it is. Furthermore, since the sub-battery is mounted on the trailer, a battery of large capacity can be used with no trouble, and merely by connecting the trailer to the vehicle body, the connection of the sub-battery can be readily achieved.

What is claimed is:

1. An electric vehicle comprising:
   a main battery mounted on a vehicle body;
   a trailer detachably connected to said electric vehicle;
   a sub-battery disposed in said trailer;
   an electric motor-generator electrically connected to said main battery and said sub-battery for being powered thereby to generate a traveling drive force, and which generates a regenerative brake force at deceleration of the vehicle body; and
   control means for controlling drive and regeneration operation of said motor-generator, wherein, when said sub-battery is connected to the vehicle body, said control means controls said motor-generator so that: (i) said motor-generator preferentially first uses an electric power of said sub-battery, before using an electric power of said main battery, for powering said motor-generator and (ii) said motor-generator preferentially first charges said main battery, before charging said sub-battery, by a regenerative power generated by said motor-generator.

2. An electric vehicle according to claim 1, wherein the driving of said motor-generator by said main battery is started after said sub-battery has been substantially completely discharged.

3. An electric vehicle according to claim 1, wherein a charging of said sub-battery by the regenerative power is started after said main battery has been completely charged.

4. An electric vehicle according to claim 1, wherein said sub-battery is mounted on a trailer which is detachably coupled to said vehicle body.

5. An electric vehicle according to claim 1, wherein said sub-battery has a larger capacity than said main battery.

6. An electric vehicle according to claim 1, wherein:
   (i) said motor-generator preferentially uses the electric power of said sub-battery for driving said motor-generator until a charge state of said sub-battery drops below a first predetermined level, and then said motor-generator uses electric power from said main battery; and
   (ii) said motor-generator preferentially charges said main battery by a regenerative power generated by said motor-generator until a charge state of said main battery reaches a second predetermined level, and then said motor-generator charges said sub-battery.

7. An electric vehicle and trailer assembly, comprising:
   a vehicle support frame;
   at least one drive wheel rotatably connected to said vehicle support frame;
   a main battery carried by said vehicle support frame;
   a motor-generator carried by said vehicle support frame for operatively rotating said drive wheel during acceleration of said vehicle, and for generating electricity during braking of said vehicle, said motor-generator being in electrical communication with said main battery;
   a controller associated with said vehicle support frame for controlling operation of said motor-generator; and
   a trailer which is detachably and releasably connectable to said electric vehicle, said trailer comprising:
      a trailer body which is detachably connectable to said vehicle support frame;
      a sub-battery carried by said trailer body, said sub-battery being in electrical communication with said motor-generator;
      wherein, during acceleration of said vehicle, said controller operates to draw power primarily from said sub-battery, to drive said motor-generator, until a charge state of said sub-battery falls below a first predetermined level, at which time said controller switches to draw power from said main battery to drive said motor-generator;
      and further wherein, during regenerative braking of said vehicle, said controller operates to send power, from said motor-generator, primarily to said main battery, until a charge state of said main battery exceeds a second predetermined level, at which time said controller operates to send power from said motor-generator to said sub-battery.

* * * * *

UNITED STATES PATENT AND TRADEMARK OFFICE
CERTIFICATE OF CORRECTION

PATENT NO.     : 6,390,215 B1                                    Page 1 of 1
DATED          : May 21, 2002
INVENTOR(S)    : Kodama et al.

It is certified that error appears in the above-identified patent and that said Letters Patent is hereby corrected as shown below:

<u>Title page,</u>
Item [74], "*Attorney, Agent, or Firm*", change "Associatres" to -- Associates --.

<u>Column 1,</u>
Line 26, change "effort" to -- efforts --.
Line numbered between 31 and 32, before "still" insert -- are --.

<u>Column 2,</u>
Line 7, delete "of"; after "motor" delete the comma.
Line 8, change the period to a comma; change "The" to -- the --.

<u>Column 3,</u>
Line 13, change "roution" to -- routine --.
Line 15, change "roution" to -- routine --.
Line 35, change "wf and Wf" to -- Wf and Wf --.

<u>Column 5,</u>
Line numbered between 31 and 32, change "vehicle v" to -- vehicle V --.
Line numbered between 50 and 51, change "movability" to -- mobility --.

<u>Column 6,</u>
Line numbered between 42 and 43, change "T2" to -- $T_2$ --.
Line numbered between 52 and 53, change "rented trailer" to -- rental trailer --.
Line numbered between 55 and 56, after "described" insert -- given features --.
Line 61, delete "present".

Signed and Sealed this

Nineteenth Day of November, 2002

*Attest:*

JAMES E. ROGAN
*Attesting Officer*     *Director of the United States Patent and Trademark Office*